(12) United States Patent
Young

(10) Patent No.: US 6,938,102 B1
(45) Date of Patent: Aug. 30, 2005

(54) DEQUEUING FROM A HOST ADAPTER TWO-DIMENSIONAL QUEUE

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 10/923,596

(22) Filed: Aug. 20, 2004

Related U.S. Application Data

(60) Division of application No. 10/443,241, filed on May 21, 2003, now Pat. No. 6,789,134, which is a continuation-in-part of application No. 10/295,618, filed on Nov. 14, 2002, now Pat. No. 6,742,053, which is a continuation-in-part of application No. 09/587,538, filed on Jun. 1, 2000, now Pat. No. 6,609,161.

(51) Int. Cl.[7] .............................................. G06F 3/00
(52) U.S. Cl. ............................. 710/5; 710/53; 710/54; 710/55; 710/56; 710/112; 712/225
(58) Field of Search ........................... 710/5, 52, 53, 710/54, 55, 56, 112; 712/225

(56) References Cited

U.S. PATENT DOCUMENTS

| | | | |
|---|---|---|---|
| 4,149,243 A | 4/1979 | Wallis ......................... | 364/200 |
| 4,395,757 A | 7/1983 | Bienvenu et al. ........... | 364/200 |
| 5,444,692 A | 8/1995 | Basso et al. .................. | 370/12 |
| 5,548,795 A * | 8/1996 | Au ............................... | 710/52 |
| 5,564,023 A | 10/1996 | Young ......................... | 710/100 |
| 5,586,196 A * | 12/1996 | Sussman ...................... | 382/114 |
| 5,625,800 A | 4/1997 | Brayton et al. ............. | 395/500 |
| 5,627,745 A | 5/1997 | Flood ........................... | 700/2 |
| 5,682,553 A * | 10/1997 | Osborne ....................... | 710/56 |
| 5,729,681 A | 3/1998 | Aditya et al. ............. | 395/200.1 |
| 5,781,199 A | 7/1998 | Oniki et al. ................. | 345/505 |
| 5,797,034 A | 8/1998 | Young .......................... | 710/24 |
| 5,818,873 A | 10/1998 | Wall et al. ................... | 375/240 |
| 5,938,747 A | 8/1999 | Young .......................... | 710/53 |
| 6,006,292 A | 12/1999 | Young .......................... | 710/39 |
| 6,012,107 A | 1/2000 | Young .......................... | 710/39 |
| 6,049,526 A | 4/2000 | Radhakrishnan et al. ... | 370/229 |
| 6,237,019 B1 | 5/2001 | Ault et al. ................... | 709/104 |
| 6,609,161 B1 | 8/2003 | Young ........................... | 710/5 |

OTHER PUBLICATIONS

U.S. Appl. No. 10/295,618, entitled "Two-Dimensional Execution Queue for Host Adapters," of B. Arlen Young, filed Nov. 14, 2002.

* cited by examiner

Primary Examiner—Jeffrey Gaffin
Assistant Examiner—Alan S Chen
(74) Attorney, Agent, or Firm—Gunnison, McKay & Hodgson, L.L.P.; Forrest Gunnison

(57) ABSTRACT

A two-dimensional command block queue includes a plurality of command blocks in a first linked list. One of the command blocks in a string is included in the first linked list. The string is delimited by only a tail pointer stored in a tail pointer list. Following dequeuing the string for processing, a pointer to the one command block of the string that was in the common queue is included in a string head pointer list. The tail pointer to the string is not changed in the tail pointer list following dequeuing of the string. This allows any new SCBs to be appended to the end of the string, while the string is being processed. This allows streaming of new SCBs to an I/O device that had previously been selected and is still connected to the host adapter.

19 Claims, 14 Drawing Sheets

DEQUEUING FROM A HOST ADAPTER TWO-DIMENSIONAL QUEUE

RELATED APPLICATIONS

This application is a division of U.S. patent application Ser. No. 10/443,241, entitled "Dequeuing From A Host Adapter Two-Dimensional Queue, of B. Arlen Young filed on May 21, 2003, and issued as U.S. Pat. No. 6,789,134, which was a continuation-in-part of and commonly assigned U.S. patent application Ser. No. 10/295,618 entitled "Two-Dimensional Execution Queue for Host Adapters," of B. Arlen Young, filed on Nov. 14, 2002 and now U.S. Pat. No. 6,742,053, which was a continuation-in-part of U.S. patent application Ser. No. 09/587,538 entitled "Two-Dimensional Execution Queue for Host Adapters," of B. Arlen Young, filed on Jun. 1, 2000 and now U.S. Pat. No. 6,609,161, both of which are incorporated herein by reference in their entirety.

BACKGROUND OF THE INVENTION

1. Field of the Invention

The present invention relates generally to host adapters that interface two I/O buses, and more particularly, to dequeuing blocks from queues for host adapters.

2. Description of Related Art

Hardware control blocks, sometimes called sequencer control blocks, or SCSI command blocks (SCBs), are typically used for transferring information between a software host adapter device driver in a host computer system 106 and a host adapter integrated circuit 120 that controls operations of one or more peripheral devices. Those of skill in the art know methods for queuing SCBs.

For example, see copending and commonly assigned U.S. patent application Ser. No. 07/964,532 entitled "Intelligent SCSI Bus Host Adapter Integrated Circuit," of Craig A. Stuber et al. filed on Oct. 16, 1992, which is incorporated wherein by reference in its entirety. See also, commonly assigned U.S. Pat. No. 5,625,800 entitled "A Sequencer Control Block Array External To A Host Adapter Integrated Circuit" of Michael D. Brayton et al. filed on Jun. 30, 1994; and also U.S. Pat. No. 5,564,023 entitled "Method for Accessing A Sequencer Control Block By A Host Adapter Integrated Circuit" of B. Arlen Young issued on Oct. 8, 1996, each of which is incorporated herein by reference in its entirety.

A prior art method for queuing SCBs for a system 100, which included a processor 105 in a host system 106 and a host adapter device 120 with a sequencer 125, used a one-dimensional linked list SCB queue 160 within a SCB array 155 in random access memory 150. A device driver executing on microprocessor 105 managed host adapter 120 using SCBs, e.g., hardware control blocks, in SCB queue 160. Each SCB in SCB queue 160 had a next queue site field Q_NEXT, sometimes referred to as field Q_NEXT, which was used to store a SCB site pointer that addressed the next SCB storage site in SCB queue 160.

Queue 160 was delimited by head pointer 141 and tail pointer 142. Head pointer 141 was the number of the site in SCB array 155 storing the SCB to be executed next, and tail pointer 142 was the number of the site in SCB array 155 containing the last SCB transferred from host system 106. Next queue site field Q_NEXT in the site addressed by tail pointer 142 had an invalid value that was used to identify the SCB as the last in queue 160 in addition to tail pointer 142.

When queue 160 was empty, head pointer 141 was an invalid value. When a new SCB was transferred from host system 106 to SCB array 155, head pointer 141 and tail pointer 142 were changed to point to the storage site of the new SCB, i.e., were changed to valid values. Field Q_NEXT in the new SCB was set to an invalid value to indicate that the SCB was the last SCB in queue 160.

As each new SCB was transferred from host system 106 to SCB array 155, tail pointer 142 was used to identify the end of queue 160. Field Q_NEXT in the SCB pointed to by tail pointer 142 was changed to point to the newly transferred SCB, and then tail pointer 142 was changed to point to the storage site of the newly transferred SCB.

A valid head pointer 141 indicated that one or more commands were available for transfer to one or more SCSI targets. The next target selected was specified by information within the SCB addressed by head pointer 141. Host adapter 120 removed the SCB at the head of queue 160 for execution and selected the specified target. Head pointer 141 was changed to point to the next SCB in queue 160, i.e., the value in field Q_NEXT of the SCB removed for execution was copied to head pointer 141. When the selection process was complete, the command contained within the SCB was transferred to the target.

SCBs in queue 160 were executed and targets were selected in the order that the SCBs were received from host system 106. This order is shown by the dashed line in FIG. 1. SCBs were not inserted or removed from the middle of queue 160.

Other methods are known for queuing SCSI command blocks for a SCSI target. See for example, U.S. Pat. Nos. 5,938,747 and 6,006,292, each of which is incorporated herein by reference. Independent of the method used to manage SCBs in a queue within the SCB array, SCBs are executed and targets are selected in the order that the SCBs were received from host system 106. SCBs are not inserted into or removed from the middle of the queue within the SCB array.

SUMMARY OF THE INVENTION

According to an embodiment of this invention, a two-dimensional command block queue, stored in a memory of a host adapter, includes a plurality of command blocks in a first linked list, sometimes called a common queue of command blocks. In one embodiment, the first linked list is delimited by a stored head pointer and a stored tail pointer. In another embodiment, only the head pointer is stored.

The two-dimensional command block queue further includes another plurality of command blocks in a second linked list, sometimes called a string. There is a specific relationship between the first and second linked lists. Specifically, one and only one of the command blocks in the string is included in the plurality of command blocks in the first linked list. Only a tail pointer delimits the string.

A tail pointer list that is stored in a host adapter memory includes the tail pointer to a tail command block in the second linked list. The tail pointer is positioned in the tail pointer list so that the storage location is indexed using a device identifier associated with each of the command blocks in the string.

A string head pointer list is also stored in a host adapter memory, which, in one embodiment, is formed from a register in each of a plurality of memories. Following dequeuing the string from the two-dimensional command block queue, a pointer to the one and only one command block of the string that was in the common queue is included in the string head pointer list. The string is dequeued from the two-dimensional command block queue for processing of the string.

Following the dequeuing of the string from the two-dimensional command block queue for processing, the tail pointer to the string is not changed in the tail pointer list. This allows any new SCBs to be appended to the end of the string, while the string is being processed. This allows streaming of new SCBs to an I/O device that had previously been selected and is still connected to the host adapter.

This feature can provide a significant performance advantage, because even though the string is not included in the two-dimensional command block queue, the presence of the tail pointer in the tail pointer list makes it appear as though the string still was in the two-dimensional queue. Consequently, the same process is used to append new SCBs to a string independent of whether the string is included in the two-dimensional command block queue.

In one embodiment, memory in which the two-dimensional command block queue is stored is a first memory and the two-dimensional command block queue is stored in a command block array in the first memory. The first memory is internal to the host adapter in one embodiment, external to the host adapter in another embodiment, and includes both internal and external memory in still another embodiment. The various pointers and lists are stored in a second memory that is different from the first memory. The second memory can comprise multiple memory units.

The two-dimensional command block execution queue is a target command block execution queue if a host adapter is functioning in an initiator mode. Conversely, the two-dimensional command block execution queue is an initiator command block execution queue if the host adapter is functioning in a target mode. The host adapter can have both a target command block execution queue and an initiator command block execution queue if the host adapter functions in both initiator and target modes. In addition, this two-dimensional queue with the dequeuing is used to manage other functions of the host adapter associated with information transfer over the I/O bus.

In another embodiment of this invention, a structure includes a two-dimensional queue. The two dimensional queue includes a common linked list of command blocks having a common head command block and a common tail command block, and a string comprising a linked list of command blocks having a string head command block and a string tail command block. Only the string head command block is included in the common linked list of command blocks.

The structure also includes: a common queue head pointer to the common head command block; a common queue tail pointer to the common tail command block; a string tail pointer list including a tail pointer to the string tail command block; and a string head pointer list. Following dequeuing the string from the two-dimensional queue, a pointer to the string head command block is included in the string head pointer list.

The common linked list contains a maximum of one command block for the string. The string contains only command blocks for a single device.

A method of managing a two-dimensional queue includes delimiting a first string of command blocks in the two-dimensional queue with a string tail pointer. The string tail pointer addresses a tail command block in the string. The string is coupled to another string in the two-dimensional queue by a link.

The method also includes dequeuing the first string from the two-dimensional queue by removing the link and leaving the string tail pointer unchanged.

To append a new command block, it is first determined whether a string for a device specified in the new command block exists. The new command block is appended to a tail of the first string upon finding that the string exists and is the first string. The new command block is appended to a tail of a common queue upon finding that the string does not exist.

In another embodiment, a method includes dequeuing a string from a two dimensional command block queue. Thus, the string is a dequeued string and the dequeued string includes a linked list of command blocks. A new command block is appended to the dequeued string. The method further includes processing the dequeued string, completing the processing of the dequeued string and appending unprocessed commands blocks in the dequeued string to the two-dimensional command block queue.

A host adapter sequencer is used in the appending operations. Another host adapter sequencer is used in the processing and completing operations.

Hence, still another method of managing command blocks uses a first sequencer to manage a two-dimensional command block queue including a plurality of strings of command blocks where each string of command blocks is a linked list. A second sequencer is used to process a string of command blocks dequeued from the two-dimensional command block queue. The first sequencer is used to append a command block to the string of command blocks dequeued from the two-dimensional command block queue.

In one embodiment of the invention, a system includes:
  a two-dimensional queue comprising:
    a plurality of command blocks in a first linked list; and
    another plurality of command blocks in a second linked list, where only one of the another plurality of command blocks is included in the plurality of command blocks in the first linked list; and
  a memory coupled to the two-dimensional queue, the memory including:
    a tail pointer to a tail command block in the second linked list wherein the tail pointer is an only delimiter for the second linked list;
    a tail pointer list including the tail pointer to the tail command block in the second linked listed; and
    a string head pointer list wherein following dequeuing the another plurality of command blocks in the second linked list from the two-dimensional queue, a pointer to the only one of the another plurality of command blocks is included in the string head pointer list.

The memory also includes a head pointer to a head command block in the first linked list and a tail pointer to a tail command block in the first linked list.

Figure 1:
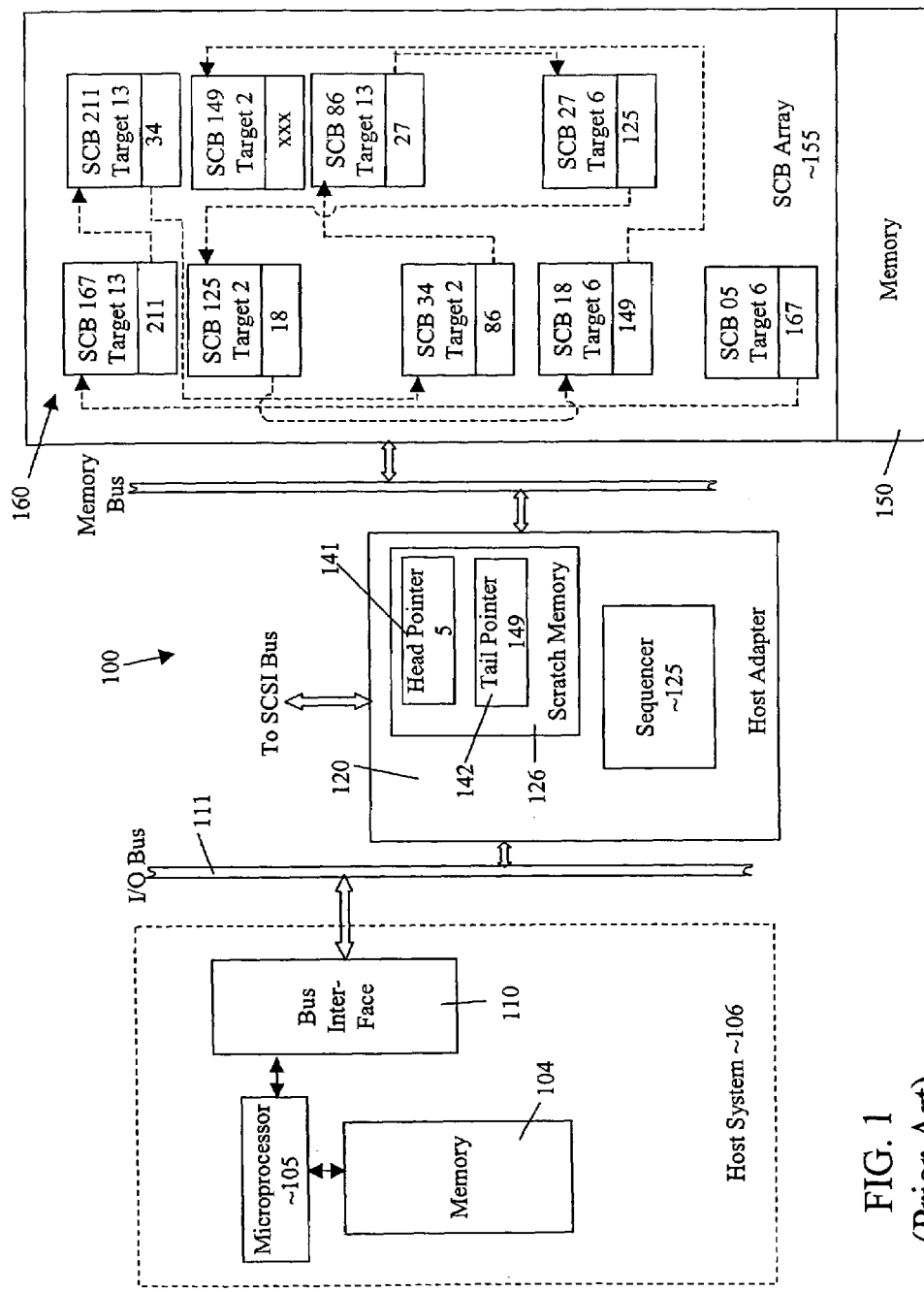
FIG. 1 is a block diagram of a prior art system that includes a linked-list, i.e., one-dimensional, SCB queue.

In the drawings and the following detailed description, elements with the same reference numeral are the same or equivalent elements. For a three-digit reference numeral, the first digit, and for a four-digit reference numeral, the first two digits are the figure number in which the element corresponding to the reference numeral first appears with the exception that reference numerals for specific command blocks, e.g., SCSI command blocks (SCBs), are the storage locations of the command blocks in a command block array (See FIG. 2) and have no correlation to the figure number.

DETAILED DESCRIPTION

According to one embodiment of the present invention, de-queuing a string from a two-dimensional command block queue 260 facilitates both multiple command block delivery to a single device over an I/O bus, such as a parallel SCSI bus or a plurality of serial bus links, and overall performance of host adapter 220. Herein, command block delivery means delivery of information associated with the command block, e.g., a command, data or perhaps status information.

Two-dimensional command block queue 260 (FIG. 2) includes a plurality of strings 270 to 272, where each string includes at least one command block, such as a SCB. As explained more completely below, two-dimensional command block queue 260 is formed in an SCB array 255 in a memory 250 of host adapter 220 in this embodiment.

Figure 3:
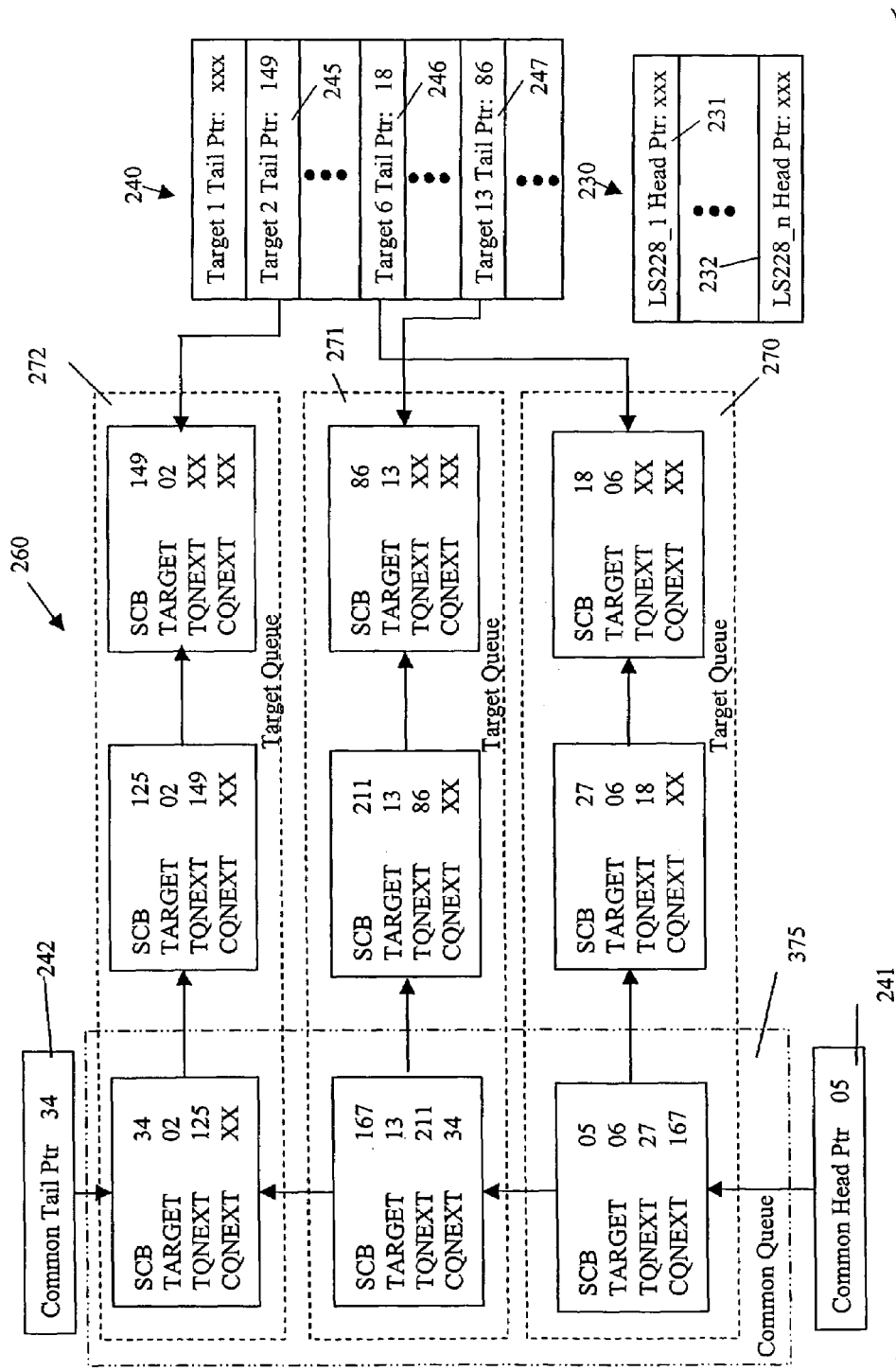
FIG. 3 is a block diagram of a host adapter system that includes the two-dimensional command block execution queue, a tail pointer list, and a head pointer list, according to one embodiment of this invention.

In this example, each of strings 270 to 272 is a queue of command blocks, e.g., SCSI command blocks (SCBs), for a specific target device on an I/O bus and two-dimensional command block queue 260 is a two-dimensional execution queue. Each of strings 270 to 272 has one and only one command block in a common queue 375 (FIG. 3). Herein, a hardware control block and a SCB are examples of a more general command block, which is a block that includes information concerning a command and/or other information that is to be transferred between a device and a host adapter over an I/O bus.

Figure 2:
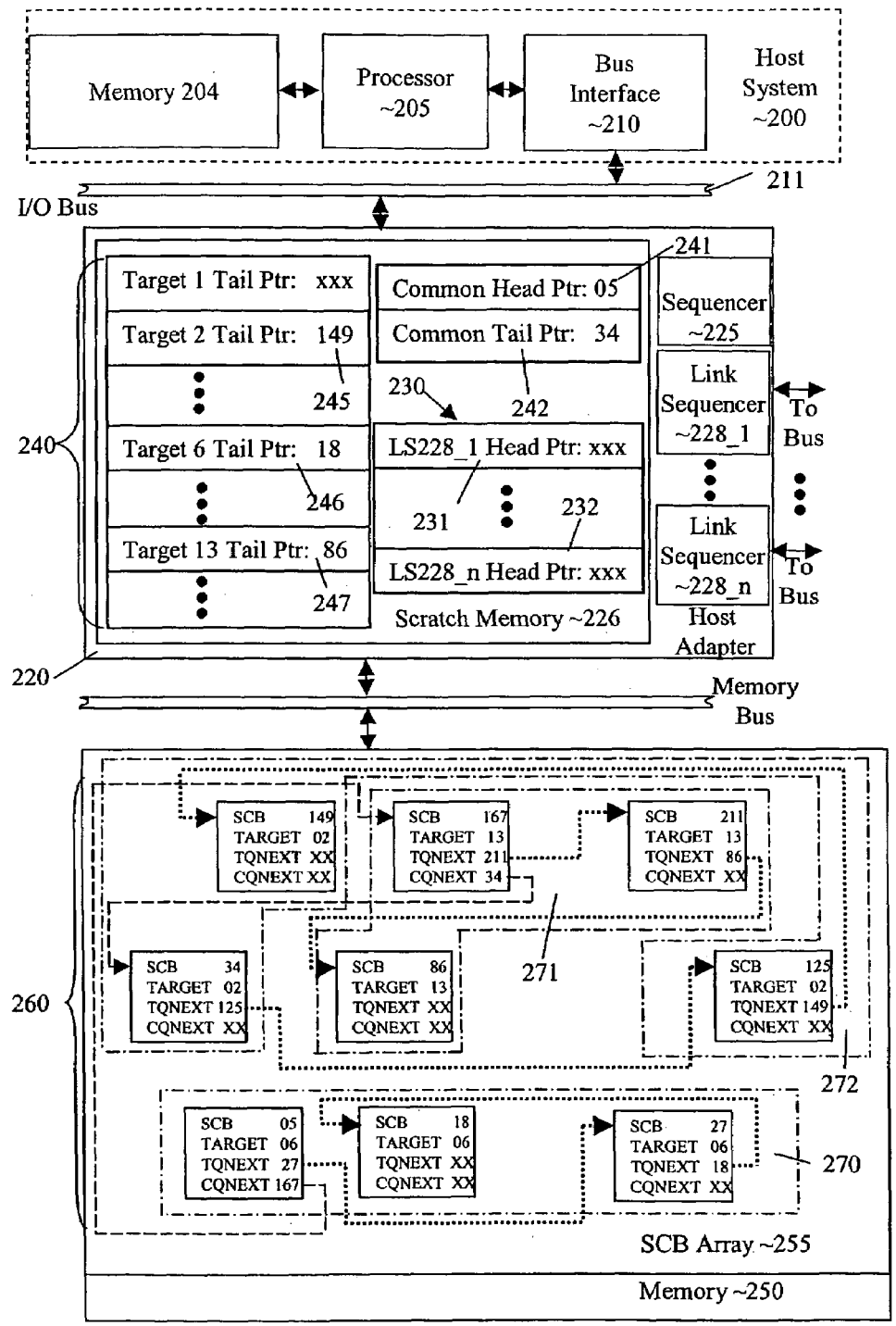
FIG. 2 is a block diagram of a host adapter system that includes a two-dimensional command block execution queue, a tail pointer list, and a head pointer list, according to one embodiment of this invention.

FIG. 3 is an alternative representation of the command blocks stored in SCB array 255 (FIG. 2). This representation shows more clearly the structure of two-dimensional command block queue 260. As indicated, common queue 375 has one and only one SCB per string. Common queue 375 is a linked list of SCBs, i.e., a linked list in a first direction. There is a link between each adjacent pair of SCBs in common queue 375, as explained more completely below.

In this embodiment, each SCB includes a next common queue site field CQNEXT, sometimes referred to herein as field CQNEXT, that contains a pointer to the next SCB in common queue 375. The pointer is a link between the two SCBs. Field CQNEXT in the last SCB in common queue 375, the common queue tail SCB, has an invalid pointer. This facilitates automated hardware in host adapter 220 determining when the end of common queue 375 is reached without having to access common queue tail pointer 242.

Each of strings 270 to 272 is a linked list of SCBs for one specific target, i.e., a linked list in a second direction. In the example of FIG. 3, string 270 is a target queue 270 for target 6; string 271 is a target queue 271 for target 13; and string 272 is a target queue 272 for target 2.

Each of target queues 270 to 272 has its own target tail pointer, i.e., target tail pointer 245 for target queue 272, target tail pointer 246 for target queue 270, and target tail pointer 247 for target queue 271. Hence, only a tail pointer delimits each string. Sometimes herein, the same reference numeral and name are used for a storage location of the pointer and a value of that pointer in that storage location.

In scratch memory 226 of host adapter 220, tail pointers 245 to 247 are stored in contiguous string tail pointer list 240 in device number order, which in this embodiment is increasing target number order. String tail pointer list 240 is sized so that there is one storage location for each device with which host adapter 220 transfers information over the I/O bus.

Initially, each entry in string tail pointer list 240 is set to an invalid value. A value for a particular string tail pointer in string tail pointer list 240 is assigned, as described more completely below. A valid value in a particular location indicates that there is a string, e.g., a target queue, for the corresponding device. When there are no longer any SCBs in a string, the value of the tail pointer for that string in string tail pointer list 240 is an invalid value.

In this embodiment, each SCB also includes a next string site field TQNEXT, sometimes referred to herein as field TQNEXT, which contains a pointer to the next SCB in the string, e.g., target queue. Thus, there also is a link between adjacent SCBs in a string. Field TQNEXT in the last SCB in the string has an invalid value. Again, this facilitates automated hardware in host adapter 220 determining when the end of the string is reached without having to access the string tail pointer in string tail pointer list 240. Note that next common queue site field CQNEXT is not used except for SCBs in common queue 375.

Common queue 375 is delimited by a common queue head pointer 241 and a common queue tail pointer 242. Common queue head pointer 241 and common queue tail pointer 242 are also stored in scratch memory 226, in this embodiment. In the example of FIGS. 2 and 3, common queue head pointer 241 has a value of "5" and common queue tail pointer 242 has a value of "34". Thus, SCB 5 is the common head SCB in common queue 375. SCB 34 is the common tail SCB in common queue 375.

In the embodiment of FIG. 2, host adapter 220 also includes a sequencer 225 that manages two-dimensional command block queue 260. Host adapter 220 also includes at least one link sequencer 228_1. If the I/O bus on which the target devices reside is a parallel SCSI bus, link sequencer 228_1 is implemented using automated hardware, in one embodiment. If the I/O bus on which the target devices reside is made up of a plurality of serial buses, host adapter 220 includes a link sequencer for each serial transmit and receive pair. The link sequencer manages a string of command blocks and is said to process the string, as described more completely below.

Thus, for generality, host adapter 220 is illustrated with a plurality of link sequencers 228_1 to 228_n, where, in one embodiment, n is eight for serial links, and is one for parallel SCSI. Each link sequencer has a string head pointer in a link sequencer string head pointer list 230. In this example, link sequencer string head pointer list 230 includes a register in a scratch memory of each of link sequencers 228_1 to 228_n.

Initially, each string head pointer in list 230 is set to an invalid value. This tells the corresponding link sequencer that a string of SCBs is unavailable for processing. A string may contain one or more SCBs.

While it is not shown in FIG. 2, host adapter 220 also includes interface hardware for each of the buses and links. The implementation of this hardware is not essential to understanding the operation of the de-queuing a string from two-dimensional command block queue 260.

The link sequencers, in one embodiment, execute firmware that controls hardware transfer of information and, in another embodiment, are automated hardware that controls transfer of information over the I/O bus. In either embodiment, the link sequencers perform the operations described herein with respect to processing SCBs in a string, and provide information to sequencer 225 concerning the completion of processing the string and the last SCB in the string that was processed.

Figure 4:
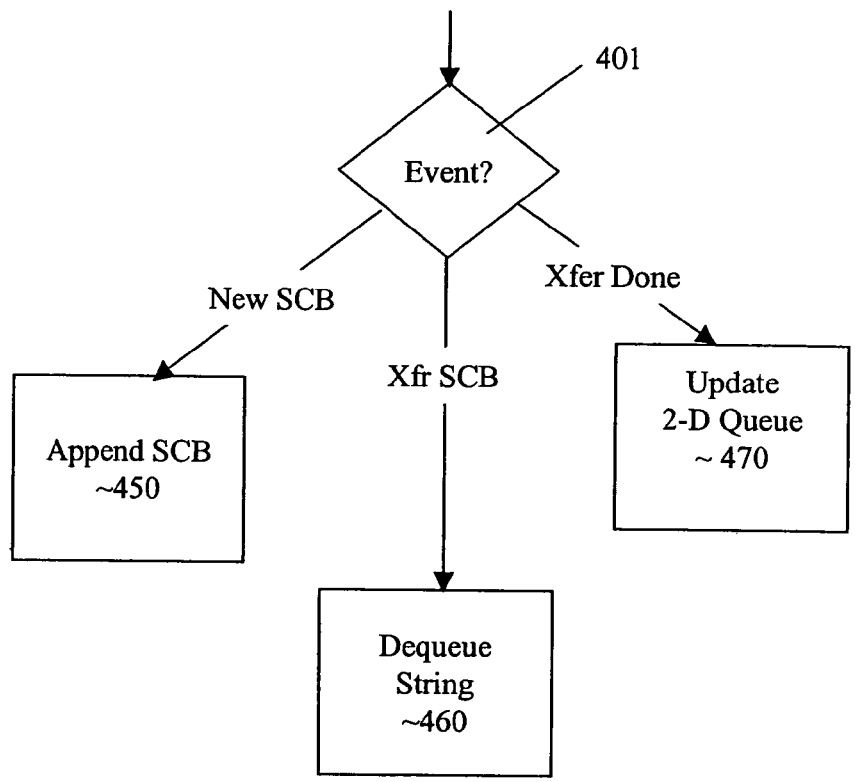
FIG. 4 is a process flow diagram of one embodiment of a processes used by a sequencer to manage the two-dimensional command block queue and addition of new SCBs to dequeued strings, according to one embodiment of this invention.
Figure 5:
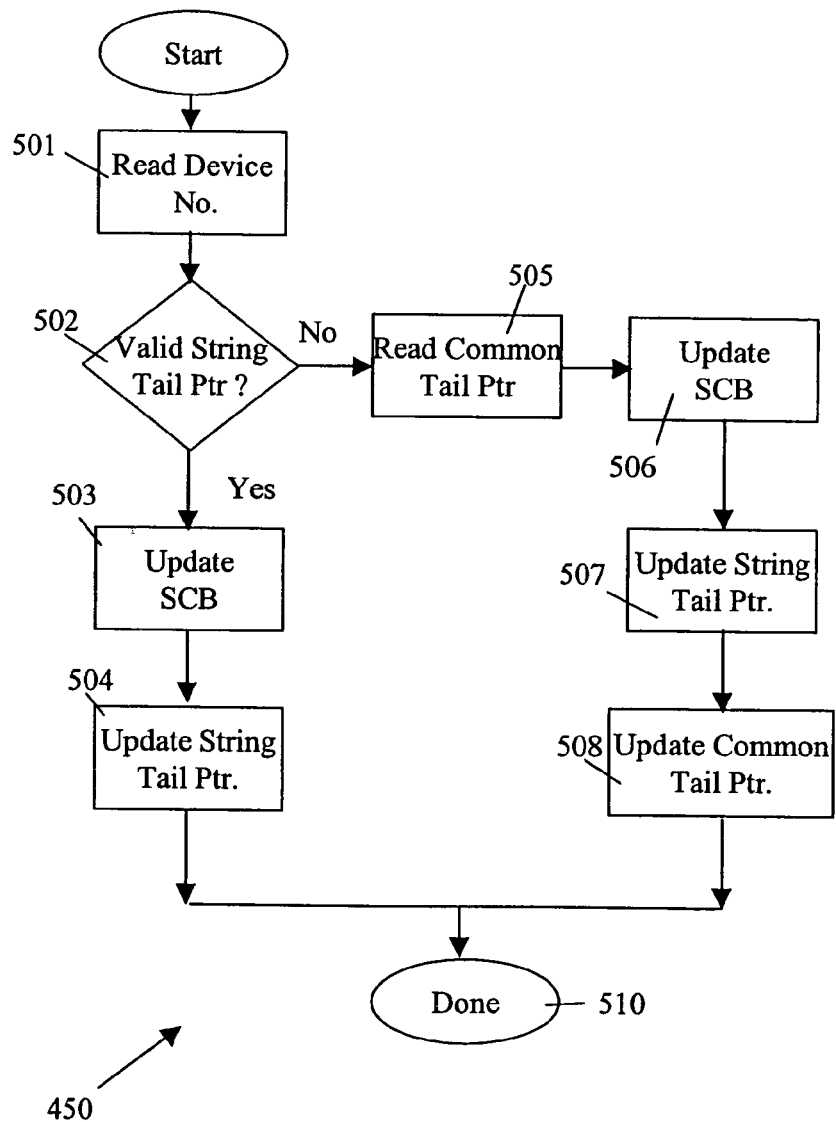
FIG. 5 is a more detailed process flow diagram for appending a new command block to a string and to a common queue of the two-dimensional command block queue, according to one embodiment of the present invention.
Figure 10:
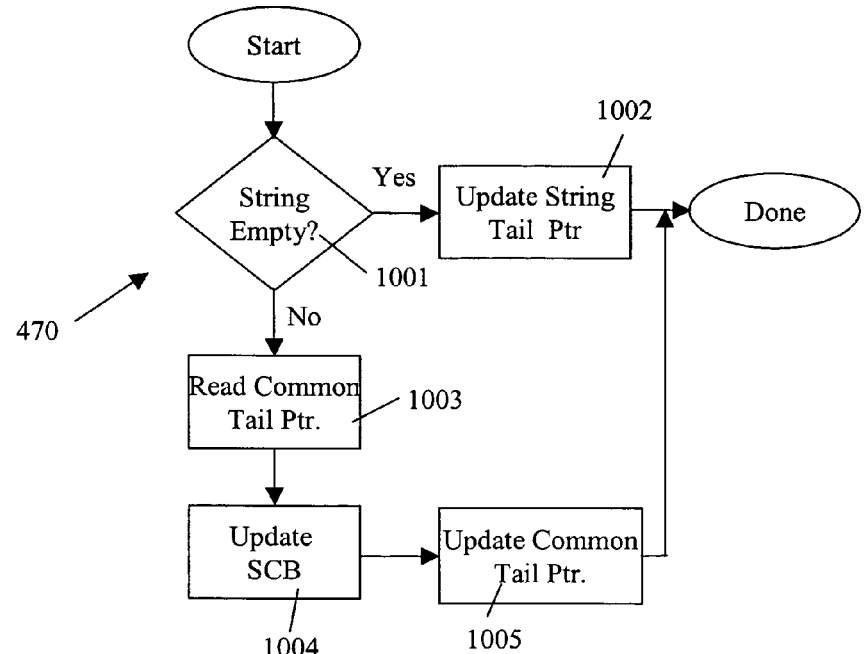
FIG. 10 is a process for updating the two-dimensional command block queue following return of string by a link sequencer according to one embodiment of this invention.

FIG. 4 is a process diagram for one embodiment of management of two-dimensional command block queue 260 by sequencer 225. When an event handler executing on sequencer 225 receives one of the two-dimension queue events, e.g., one of a new SCB event, a transfer SCB event, or a transfer done event, event check operation 401 transfers processing to the appropriate process, e.g., append SCB process 450 (FIG. 5), dequeue string process 460 (FIG. 6), or update two-dimensional queue process 470 (FIG. 10), respectively. Each of processes 450, 460, and 470 is described more completely below.

Briefly, append SCB operation 450 determines the device specified in a new SCB. If there is not a string for the device specified in the new SCB, the new SCB is appended to the tail of common queue 375 and is the only SCB in the string for that device.

If there is a string for the device specified in the new SCB, the new SCB is appended to the tail of that string by append SCB process 450. This is done independent of whether the string is a part of two-dimensional command block queue 260, or has been dequeued from queue 260 for processing by a link sequencer.

Dequeue string process 460 removes a string from two-dimensional command block queue 260 before any of the SCBs in the string are executed. In the example of FIG. 2, the string is provided to a link sequencer so that the link sequencer can transmit the commands in the string to the specified device. Even though the removed string is not in two-dimensional command block queue 260, the string tail pointer in string tail pointer list 240 is not changed to an invalid value when the string is dequeued from two-dimensional command block queue 260.

Update two-dimensional queue process 470 determines whether all the SCBs in a string have been processed after the link sequencer indicates that processing of the string is complete. If unprocessed SCBs remain in the string, a first unprocessed SCB of the string is appended to common queue 375 as the common tail SCB. If all the SCBs have been processed, the string tail pointer for that string, in string tail pointer list 240, is set to an invalid value.

A SCB is built in memory 204 (FIG. 2) by a device driver executing on processor 205, in a manner similar to that in the prior art. In particular, the device driver specifies the SCB storage location for the SCB in SCB array 255, and sets field CQNEXT and field TQNEXT to invalid values in one embodiment. Alternatively, these fields can be set by firmware executing on sequencer 225. The SCB is transferred from memory 204 to the specified storage location in SCB array 255. The particular process used to transfer the SCB from memory 204 to SCB array 255 is not essential to this invention.

Those of skill in the art will appreciate that when it is stated that a command block or a SCB is transferred to a target device, typically the complete block received from a host is not transferred. Rather, a portion of the command block, sometimes referred to as a command, is transferred to the target device. Accordingly, herein transfer of a SCB, a hardware control block, or a command block to a target device means transfer of only that portion of the block necessary to inform the target device of the operation or operations that the target device needs to perform. In other embodiments, transfer of a SCB, a hardware control block, or a command block means transfer of information in accordance with the particular operation being performed over the I/O bus.

In this embodiment, SCB array 255 includes 512 storage locations, and a reference number of an SCB indicates the storage location within SCB array 255. The number of storage locations is illustrative only and is not intended to limit the invention to any particular size. In one example, there is only one link sequencer that is automated hardware, and SCB array 255 has 256 storage locations. In another embodiment, hundreds of target devices are supported and so SCB array 255 is sized to hold a queue for the number of devices that are online at any given time.

Moreover, in one embodiment, memory 250 is internal to host adapter 220. In another embodiment, memory 250 is external to host adapter 220 and in still another embodiment is a combination of internal and external memory.

When append SCB process 450 is launched, sequencer 225 reads a device number from the SCB in read device number operation 501. (See FIG. 5) The device number specifies the device on the I/O bus for which the SCB is directed. Processing transfers from read device number operation 501 to valid string tail pointer check operation 502.

In valid string tail pointer check operation 502, the device number, which in this example is a target number, is used as index to a string tail pointer storage location in a string tail pointer list 240, which, in this example, is a list of target queue tail pointers. If the value at the indexed location in string tail pointer list 240 is an invalid value, there is not a string for the device in two-dimensional command block queue 260 and so the current SCB is appended to the end of common queue 375. Conversely, if there is a valid value at the indexed location in string tail pointer list 240, a string exists and the current SCB is to be appended to the end of that string independent of whether the string is in two-dimensional control block queue 260 or has been dequeued for processing by a link sequencer. Thus, if the string tail pointer at the indexed location in string tail pointer list 240 has an invalid value, processing transfers to read common queue tail pointer operation 505 and otherwise transfers to update SCB operation 503.

If a valid string tail pointer exists for a device, there is a string for that device in SCB array 255. Consequently, update SCB operation 503 accesses the SCB addressed by the string tail pointer read in operation 502. Update SCB operation 503 writes the location of the new SCB within SCB array 255 in field TQNEXT of the SCB addressed by the string tail pointer. Update SCB operation 503 transfers processing to update string tail pointer operation 504.

In update string tail pointer operation 504, the string tail pointer in string tail pointer list 240 that is indexed by the device number in the new SCB is changed to point at the storage location, in SCB array 255, of the new SCB. Operation 504 transfers to done operation 510, because the new SCB has been appended to the appropriate string.

If a valid string tail pointer does not exist for a device in string tail pointer list 240, there is not a string for that device in SCB array 255. Consequently, read common queue tail pointer operation 505 reads the common queue tail pointer in memory 226 to determine the storage location of the last SCB in common queue 375. Read common queue tail pointer operation 505 transfers processing to update SCB operation 506.

Update SCB operation 506 accesses the SCB addressed by the value of common queue tail pointer 242. Update SCB operation 506 writes the location of the new SCB within SCB array 255 in field CQNEXT of the SCB addressed by common queue tail pointer 242. Update SCB operation 506 transfers processing to update string tail pointer operation 507.

In update string tail pointer operation 507, the string tail pointer in string tail pointer list 240 indexed by the device number is changed to point at the location, in SCB array 255, of the new SCB. Operation 507 transfers update common queue tail pointer operation 508.

In update common queue tail pointer operation 508, common queue tail pointer 242 is changed to point at the location, in SCB array 255, of the new SCB. Operation 508 transfers to done operation 510, because the new SCB has been appended to end of common queue 375, and a new string has been defined in two-dimensional command block queue 260. Using append SCB process 450, SCBs are appended to the string and if appropriate, common queue 375 in the order of arrival from host system 200.

Figure 6:
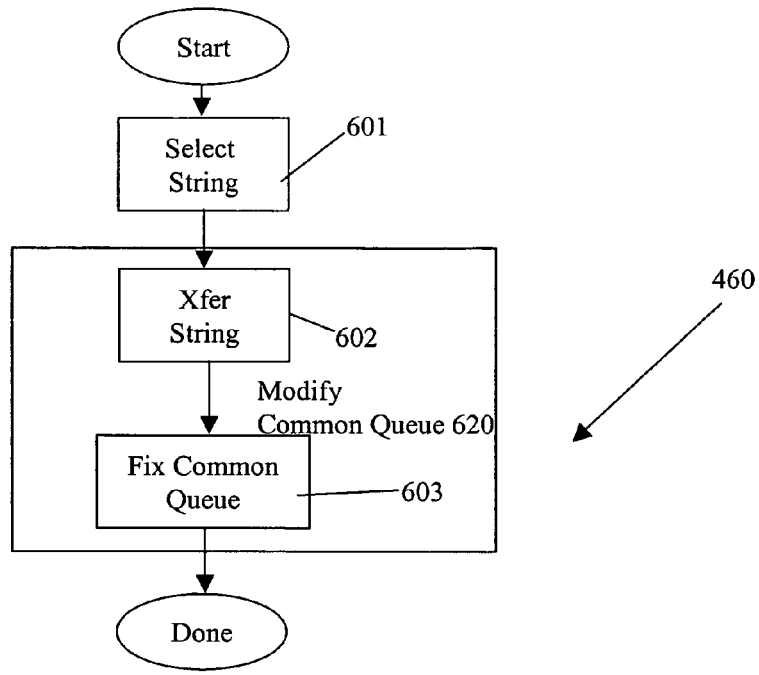
FIG. 6 is a process flow diagram of one embodiment of a method for managing dequeuing a string from the two-dimensional command block queue of FIGS. 2 and 3.

To dequeue a string from two-dimensional command block queue 260, firmware is executed by sequence 225 that launches dequeue string process 460 (FIG. 6). In select string operation 601, sequencer 225 determines a string that is to be dequeued from two-dimensional command block queue 260. In one embodiment, select string operation 601 reads common queue head pointer 241, and then selects the string including the SCB addressed by common queue head pointer 241. In the example of FIG. 3, common queue head pointer 241 addresses SCB 5, which specifies target 6. In another embodiment, sequencer 225 could walk common queue 375 to find a SCB for a particular device that has been selected for example. In each case, select string operation 601 obtains a pointer to a command block in common queue 375, which is the head command block in the string to be dequeued.

Upon completion of select string operation 601, processing transfers to modify common queue operation 620. Operation 620 first transfers the selected string to a link sequencer in transfer string operation 602. Next, operation 620 fixes common queue 375 to reflect that the string is no longer in common queue 375 in fix common queue operation 603.

In one embodiment, transfer string operation 602 copies the pointer to the command block in common queue 375, which is the head command block in the string to be dequeued, to a link sequencer head pointer register in list 230. This effectively transfers the string from two-dimensional command block queue 260 to the link sequencer before any of the SCBs in the string are executed.

In this example, the string including the SCB addressed by the value of common queue head pointer 241 was selected in operation 601. Thus, operation 602 copies the value of common queue head pointer 241 to link sequencer head pointer register 231 for link sequencer 228_1 in list 230.

In one embodiment, there is an in-mailbox and an out-mailbox for each link sequencer. Sequencer 225 writes the value of common queue head pointer 241, or alternatively, the pointer to the string head command block of the string to be dequeued, into the in-mailbox for the link sequencer in operation 602. Upon detecting that there is a valid pointer in-mailbox, e.g., the in-mailbox has been written to, the link sequencer copies the value in the in-mailbox to a register in scratch memory of the link sequencer and thereby completes operation 602. Hence, in this embodiment, list 230 has an entry in a scratch memory of each link sequencer. Consequently, the memory storing list 230 is made up of parts of several different memories. Also, operation 602 is completed using two sequencers in this example.

Hence, when list 230 is said to be stored in a memory, the memory is not limited to a single physical memory unit. Also, list 230 is not required to be in consecutive memory locations.

Upon completion, transfer string operation 602 transfers to fix common queue operation 603. In this embodiment, fix common queue operation 603 repairs common queue 375 in view of the string that was removed.

Figure 7A:
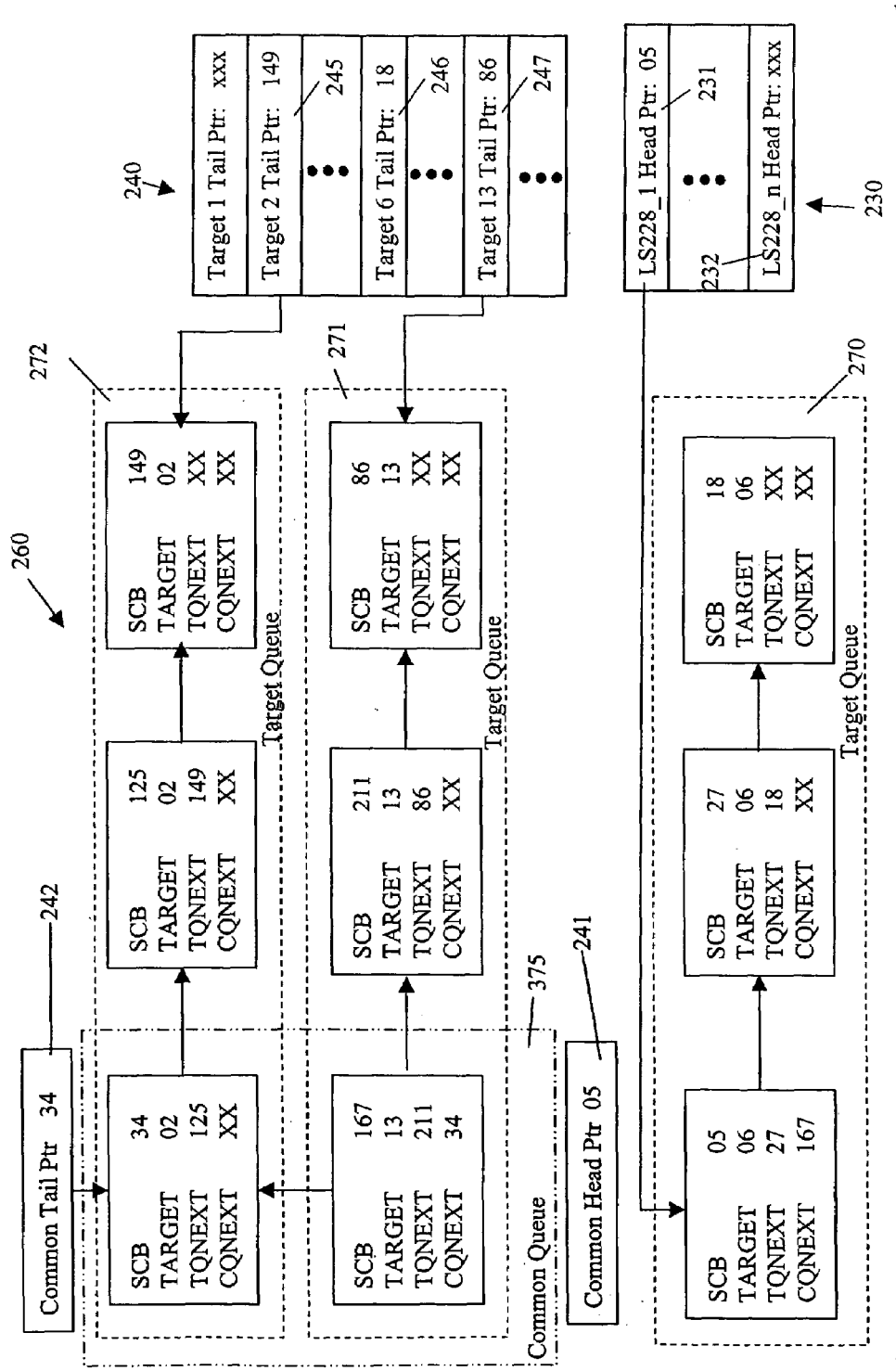
FIGS. 7A and 7B are an illustration applying the method of FIG. 6 to the two-dimensional command block queue of FIGS. 2 and 3.
Figure 7B:
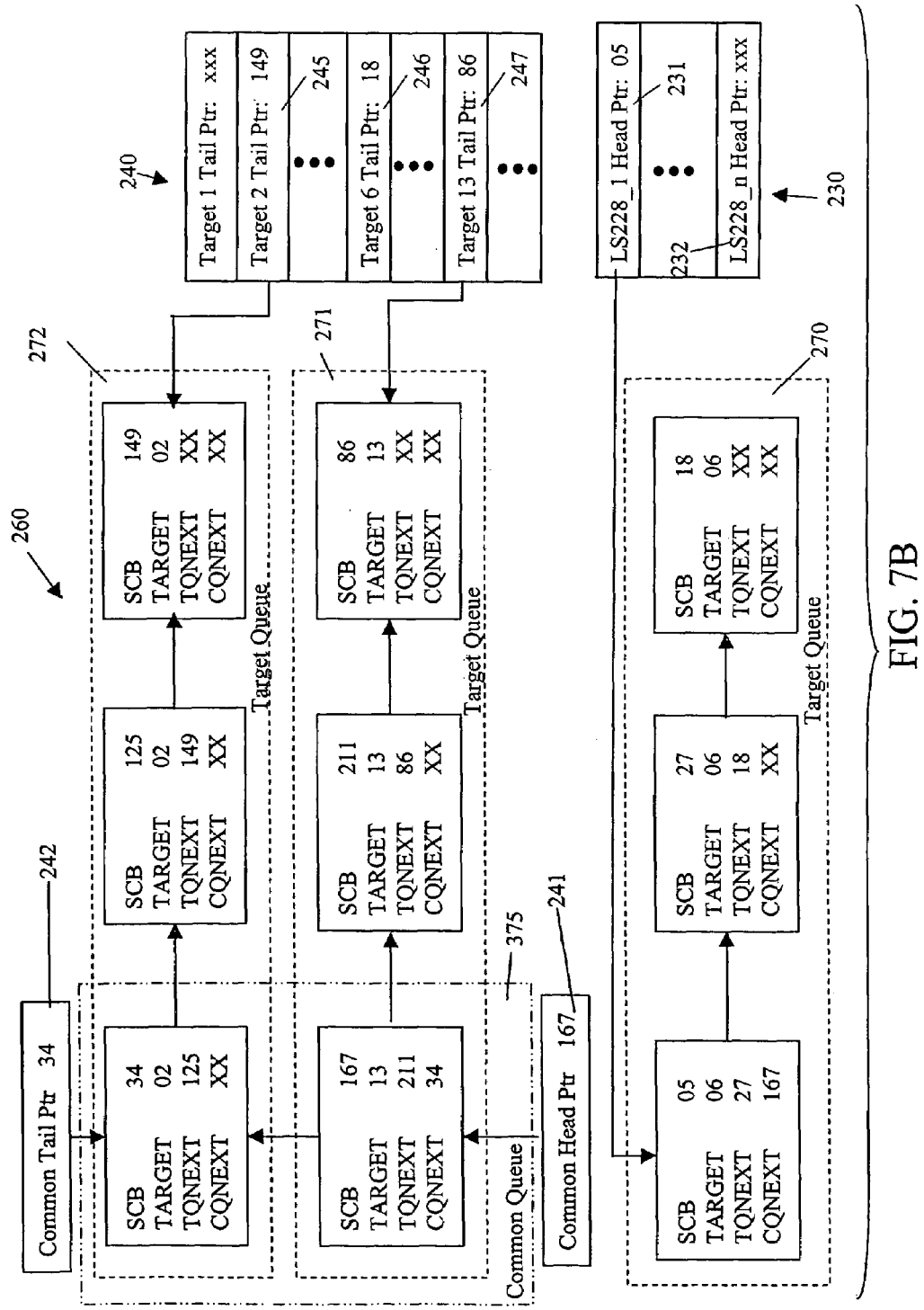

In this example, where the string including the SCB addressed by the value of common queue head pointer 241 was removed, fix common queue operation 602 reads the value in field CQNEXT of the command block addressed by value of common queue head pointer 241. The value read from field CQNEXT is written to common queue head pointer 241. Thus, in this example, the value of "167" in field CQNEXT of SCB 5 is written in common queue head pointer 241. See FIG. 7B.

If a string, other than the string including the SCB addressed by the value of common queue head pointer 241, is removed from two-dimensional command block queue 260, the operations performed in fix common queue operation 602 are different. There are two other possibilities: a string including a SCB in common queue 375 that is neither the head SCB nor the tail SCB of common queue 375, i.e., an intermediate SCB, was selected for removal; and a string including the tail SCB, i.e., the SCB addressed by the value of common queue tail pointer 242, was selected for removal.

In selecting a string, other than the string including the SCB addressed by the value of common queue head pointer 241, in common queue 375 for removal, operation 601 also saves a pointer to a preceding SCB, i.e., a pointer to the storage location of the SCB in common queue 375, which immediately precedes the head SCB in the string being removed in common queue 375. In this case, fix common queue operation 603 reads the value in field CQNEXT of the SCB being removed and writes this value in field CQNEXT of the preceding SCB.

If the value in field CQNEXT of the SCB being removed is an invalid value, i.e., the common tail SCB is being removed, the pointer to the preceding SCB storage location is written to common queue tail pointer 242. Also, field CQNEXT in the preceding SCB is set to an invalid value to indicate that the preceding SCB is now the common queue tail SCB. This effectively removes the string from two-dimensional command block queue 260 and repairs common queue 375 when the string is either an intermediate string or a tail string in two-dimensional command block queue 260.

Notice that although string 270 is no longer included in two-dimensional command block queue 260, tail pointer 246 in string tail pointer list 240 is not set to an invalid value to indicate that there is not a string in two-dimensional command block queue 260 for target 6. By maintaining the value in tail pointer 246, sequencer 225 can add SCBs to string 270 even though string 270 is not in two-dimensional command block queue 260, as described more completely below.

Figure 8:
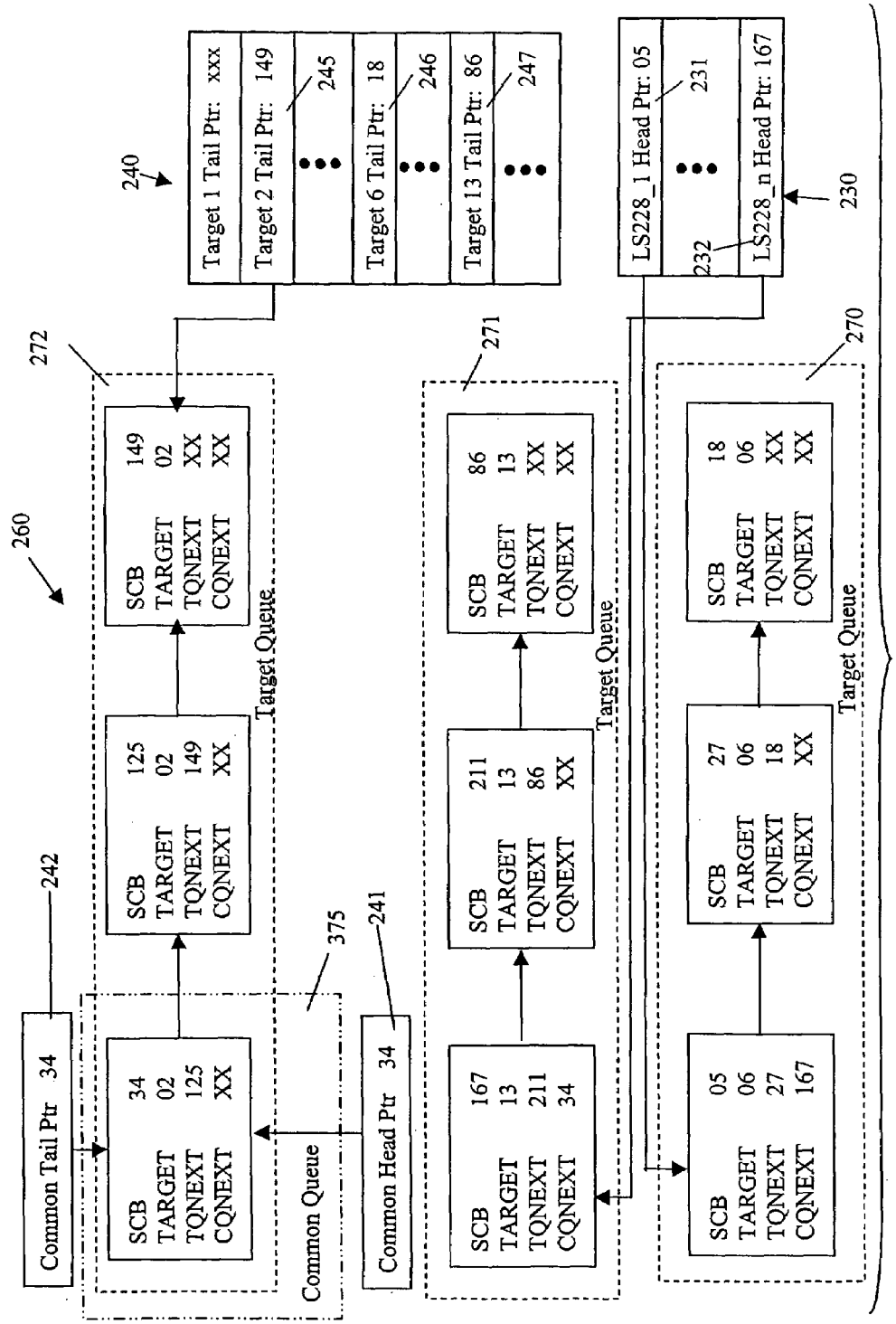
FIG. 8 is an illustration applying the method of FIG. 6 to the two-dimensional command block queue of FIG. 7B.

Operations 601 to 603 can be executed again for dequeuing another string from two-dimensional command block queue 260, before the SCB or SCBs in string 270 are executed and string 270, or else a pointer to the last SCB executed, is returned, by link sequencer 228_1, to sequencer 225. For example, as illustrated in FIG. 8, string 271 has been removed from common queue 375 and the pointer to SCB 167 loaded in link sequencer head pointer 232 of link sequencer 228_n. This was accomplished via operations 601 to 603 and so the specific operations are not repeated, but are apparent in view of the above description of those operations.

Figure 9A:
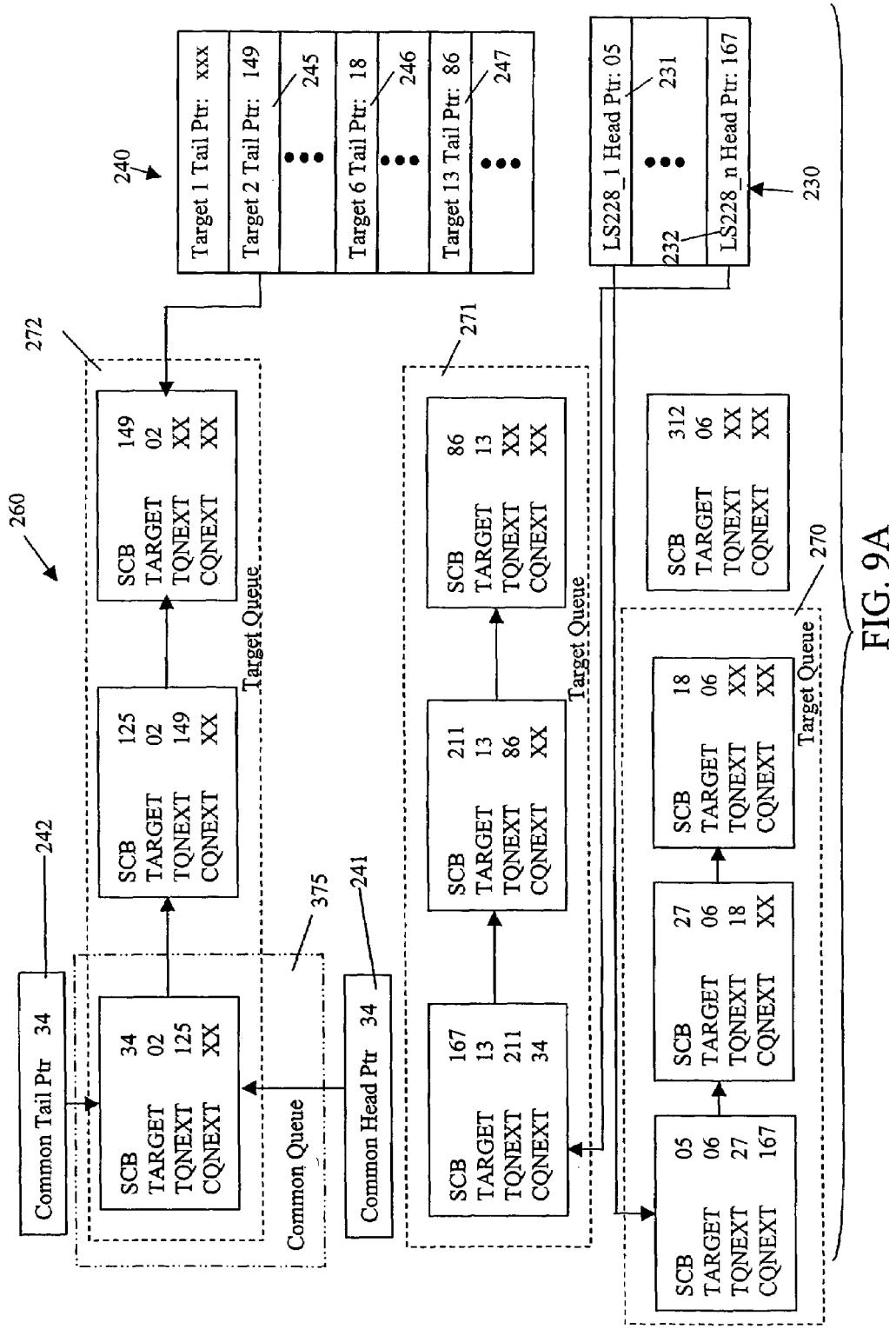
FIGS. 9A to 9C are an illustration applying the method of FIG. 5 to the two-dimensional command block queue of FIG. 8.

Next, assume that sequencer 225 receives a new SCB 312 for target 6. (See FIG. 9A.) Sequencer 225 uses append SCB process 450 to append SCB 312 to string 270. Specifically, in read device number operation 501, sequencer 225 reads target number 6 from SCB 312 and transfers processing to valid string tail pointer check operation 502.

In valid string tail pointer check operation 502, sequencer 225 reads the location in string tail pointer list 240 for target 6 and so reads target 6 tail pointer 246. Sequencer 225 determines that a valid value is stored in target 6 tail pointer 246. Accordingly, valid string tail pointer check operation 502 transfers processing to update SCB operation 503.

Figure 9B:
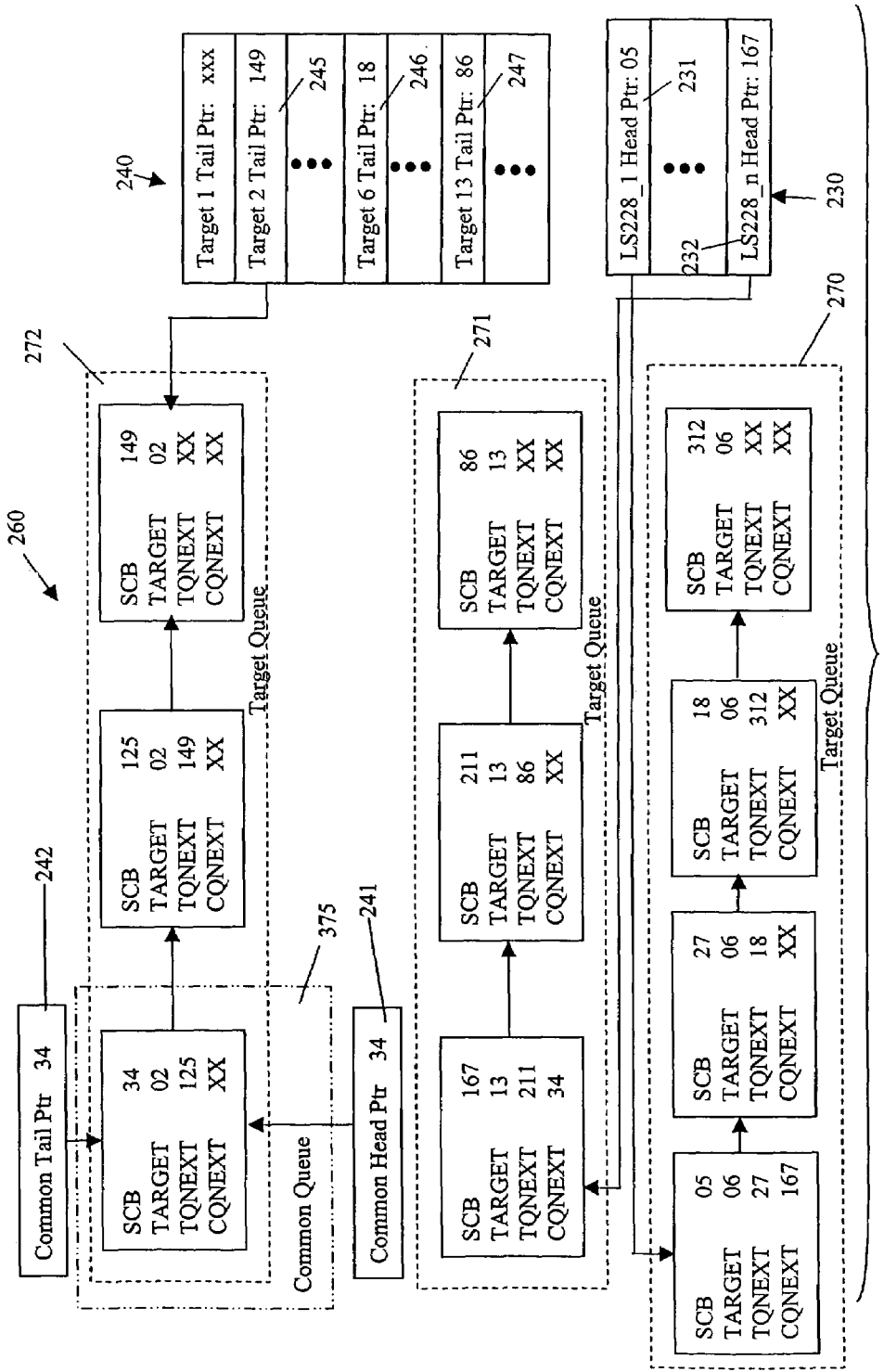

Update SCB operation 503 accesses the SCB addressed by the string tail pointer read in operation 501, i.e., in this example, SCB 18. Update SCB operation 503 writes the location of the new SCB within SCB array 255, i.e., 312, in field TQNEXT of SCB 18, the SCB addressed by the target tail pointer. (See FIG. 9B.) Update SCB operation 503 transfers processing to update string tail pointer operation 504.

In update string tail pointer operation 504, the target tail pointer in string tail pointer list 240 that is indexed by the target number in the new SCB, i.e., target 6 tail pointer 246, is changed to point at storage location 312, in SCB array 255, of the new SCB. (See FIG. 9C) Operation 504 transfers to done operation 510, because the new SCB has been appended to the appropriate string 270 to form string 270A. This is accomplished correctly even thought string 270 is not included in two-dimensional command block queue 260 at the time of arrival of the new SCB.

While process 450 has been used to append a new SCB to a dequeued string, process 450 works in the same way when the string is in-dimensional command block queue 260. Thus, an example of using process 450 to append a new SCB to a string in queue 260 would be equivalent to that just presented and so that description is not repeated for a string in queue 260.

After a valid pointer is loaded in link sequencer head pointer 231, link sequencer 228_1 attempts to transfer the commands contained in all the SCBs in target queue 270 to target 6, e.g., link sequencer 228_1 processes the SCBs in string 270. The particular procedure for transferring command blocks to a target is dependent on the protocol used, and the procedure is known to those of skill in the art.

For example, for a serial link, it is possible that the commands within all the SCBs in the target queue cannot be transferred to the target device following selection of the target device. For example, the target's command queue may be full while link sequencer 228_1 has more SCBs in target queue 270A (FIG. 9C) to transfer. Upon completion of the transfer to target 6, e.g., upon completion of processing of the SCBs, in this example, link sequencer 228_1 notifies sequencer 225 that the processing of string 270 is complete, e.g., the transfer of SCBs to target 6 is complete.

In one embodiment, when a SCB in the string is completed, a completion status flag in the SCB is asserted, and the value in field TQNEXT is used to access the next SCB to be processed. In this embodiment, when processing is complete link sequencer 228_1 copies the value in link sequencer head pointer register 231 in list 230 to the out-mailbox for link sequencer 228_1 and notifies sequencer 225.

In another embodiment, when a SCB is completed, link sequencer 228_1 reads the value in field TQNEXT of the completed SCB and updates register 231 with the pointer to the completed SCB. Thus, when processing is completed register 231 contains a pointer to the last SCB completed that in turn is copied to the out-mailbox.

Thus, in either embodiment, link sequencer 228_1 provides sequencer 225 the pointer to the storage location in SCB array 255 of a SCB in string 270. Sequencer 225 knows whether the pointer is to the last SCB completed in string 270 or the pointer is to the original head SCB in string 270, i.e., each string in a particular two-dimensional queue is handled in the same way.

As explained above, event-check operation 401 (FIG. 4) transfers processing to update two-dimensional queue process 470 (FIG. 4 and FIG. 10) when sequencer 225 receives notice from a link sequencer that processing of a string is complete, i.e., stopped. In string empty check operation 1001 (FIG. 10), sequencer 225 first determines the target for which transfer is complete and retrieves the pointer from the out-mailbox of the link sequencer.

In the first embodiment, where the entire string is returned and completion status flags have been asserted in completed SCBs, sequencer 225 walks the string to find the first unprocessed SCB. In this example, sequencer 225 reads the completion status flag in the SCB addressed by the returned pointer. If the completion status flag is asserted, the value in field TQNEXT is read and the head pointer to the string changed to the read value. Using the string head pointer, the completion status flag in the next SCB in the string is read. This process is repeated until either an invalid value is read in field TQNEXT, or an un-asserted completion status flag is detected. In each case, the string head pointer either addresses the last SCB in the string, or the first SCB that was not completed.

In the second embodiment, where the pointer returned is to the last SCB completed in the string, sequencer 225 reads field TQNEXT in the addressed SCB. If the field contains a valid value, it is a pointer to the first unprocessed SCB in the string and is written to the head string pointer. If the field contains an invalid value, all SCBs in the string were processed. Hence, in either embodiment, string empty check operation 1001 determines whether all the SCBs in the string were transferred to the selected target device, e.g., whether all the SCBs in the string were transferred.

Figure 9C:
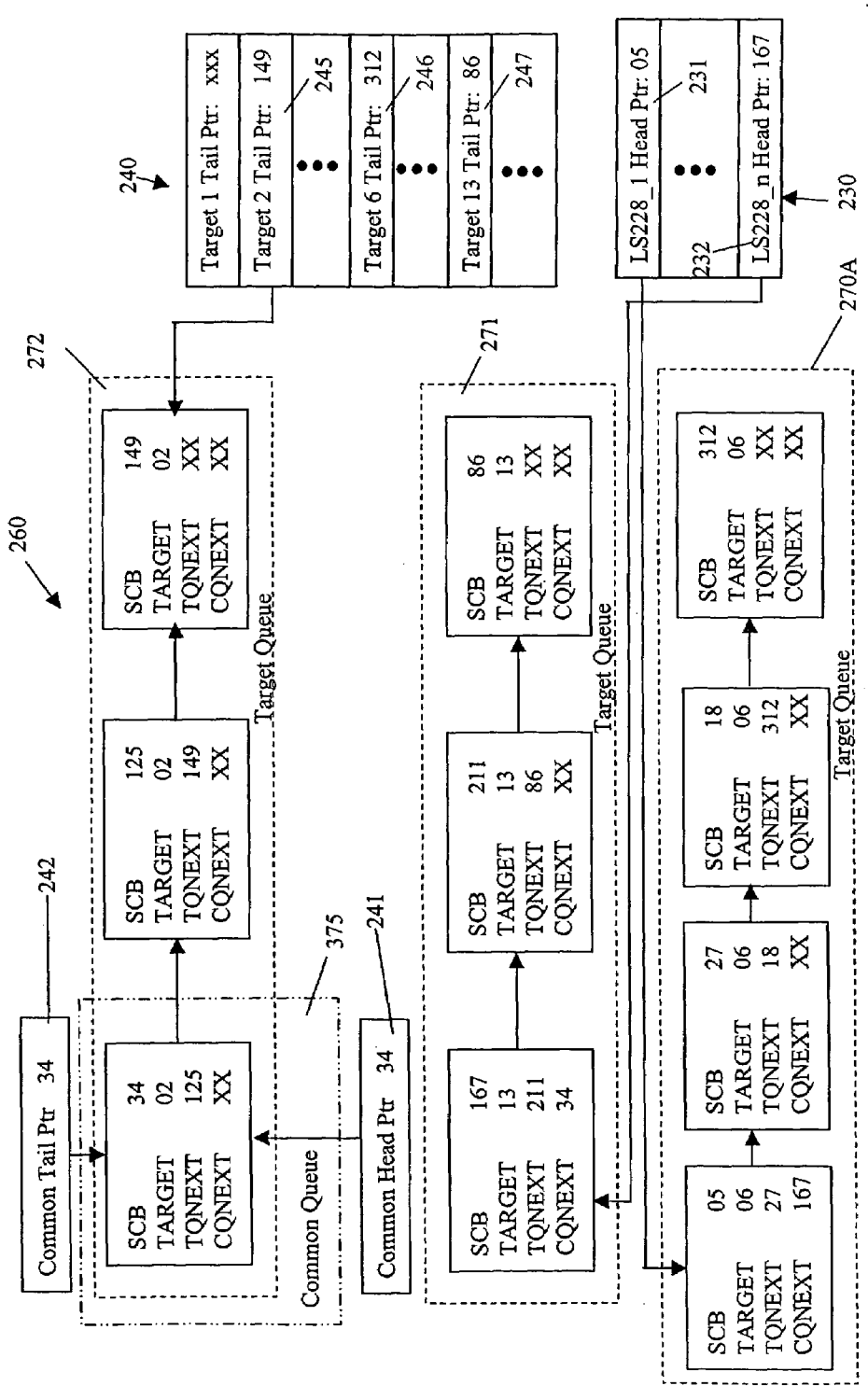

In the embodiment of FIG. 9C, SCB 5 was completed and the completion status flag was asserted. The value in register 231, which was 5, was returned to sequencer 225. Starting with SCB 5, sequencer 225 walks string 270A to find the first SCB with a completion status flag un-asserted, or with an asserted completion status flag and an invalid value in field TQNEXT.

Field TQNEXT in SCB 5 contains a valid value "27" and so string 270A is not empty. Because string 270A is not empty, processing transfers from string empty check operation 1001 to read common queue tail pointer operation 1003.

In read common queue tail pointer operation 1003, sequencer 225 reads common queue tail pointer 242. With respect to update two-dimensional queue process 470 and in general, reference to sequencer 225 taking an action refers to the action that results from firmware executing on sequencer 225. In the example of FIG. 9C, common queue tail pointer 242 addresses SCB 34 that is at the end of common queue 375. Operation 1003 transfers to update SCB operation 1004.

Figure 11A:
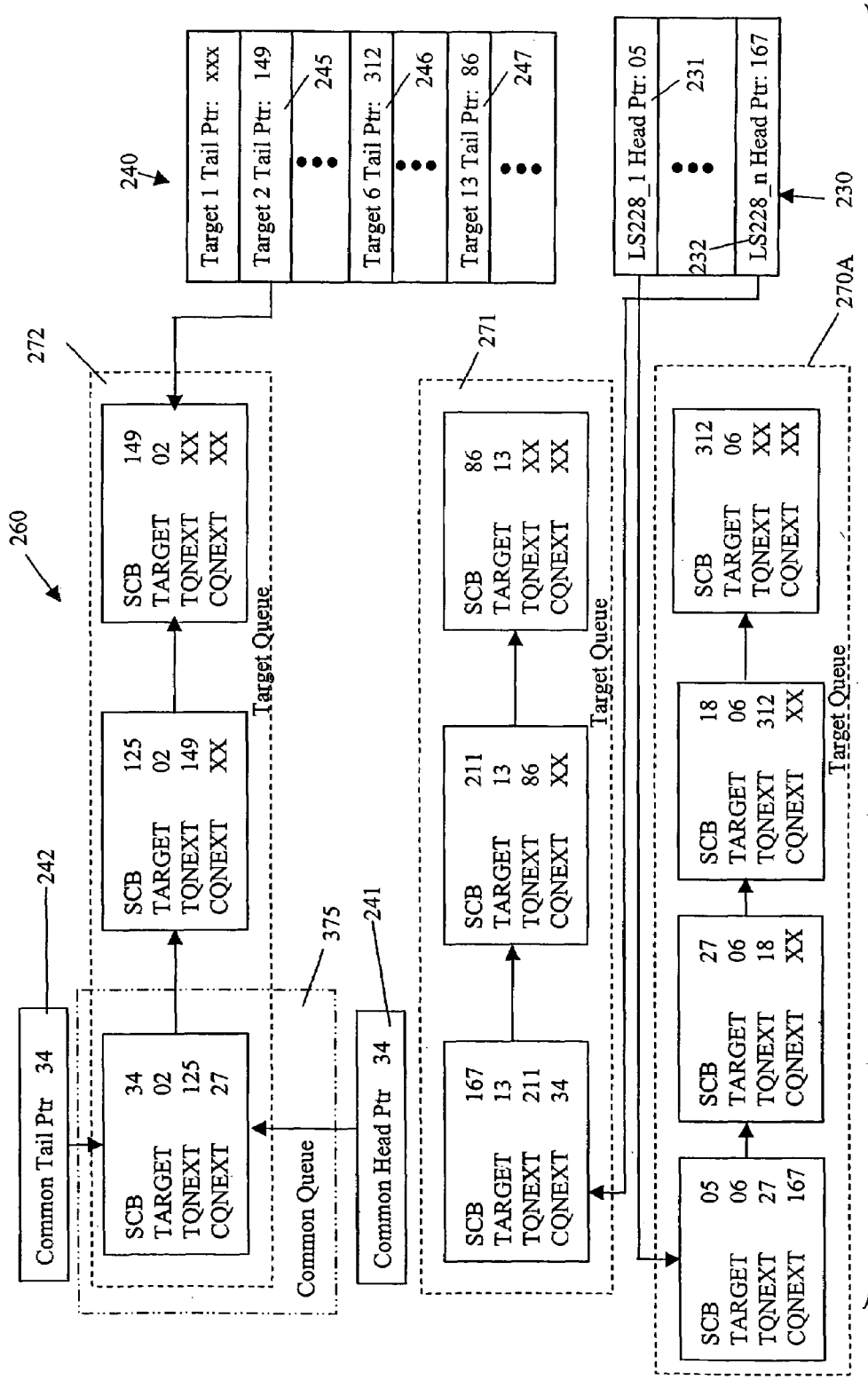
FIGS. 11A and 11B are an illustration applying the method of FIG. 10 to the two-dimensional command block queue of FIG. 9C following processing of the first SCB in the returned string.

In update SCB operation 1004, field CQNEXT in the SCB addressed by common queue tail pointer 242 is set to the value of the location in SCB array 255 of the first SCB remaining in the string. In this example, sequencer 225 reads field TQNEXT in SCB 5, which is the last SCB executed. Field TQNEXT in SCB 5 contains "27," which is storage location in SCB array 255 of the first SCB in string 270A to be executed. Accordingly, sequencer 225 writes "27" to field CQNEXT in SCB 34 that is addressed by common queue tail pointer 242 (FIG. 11A). Update SCB operation 1004 transfers processing to update common queue tail pointer operation 1005.

Figure 11B:
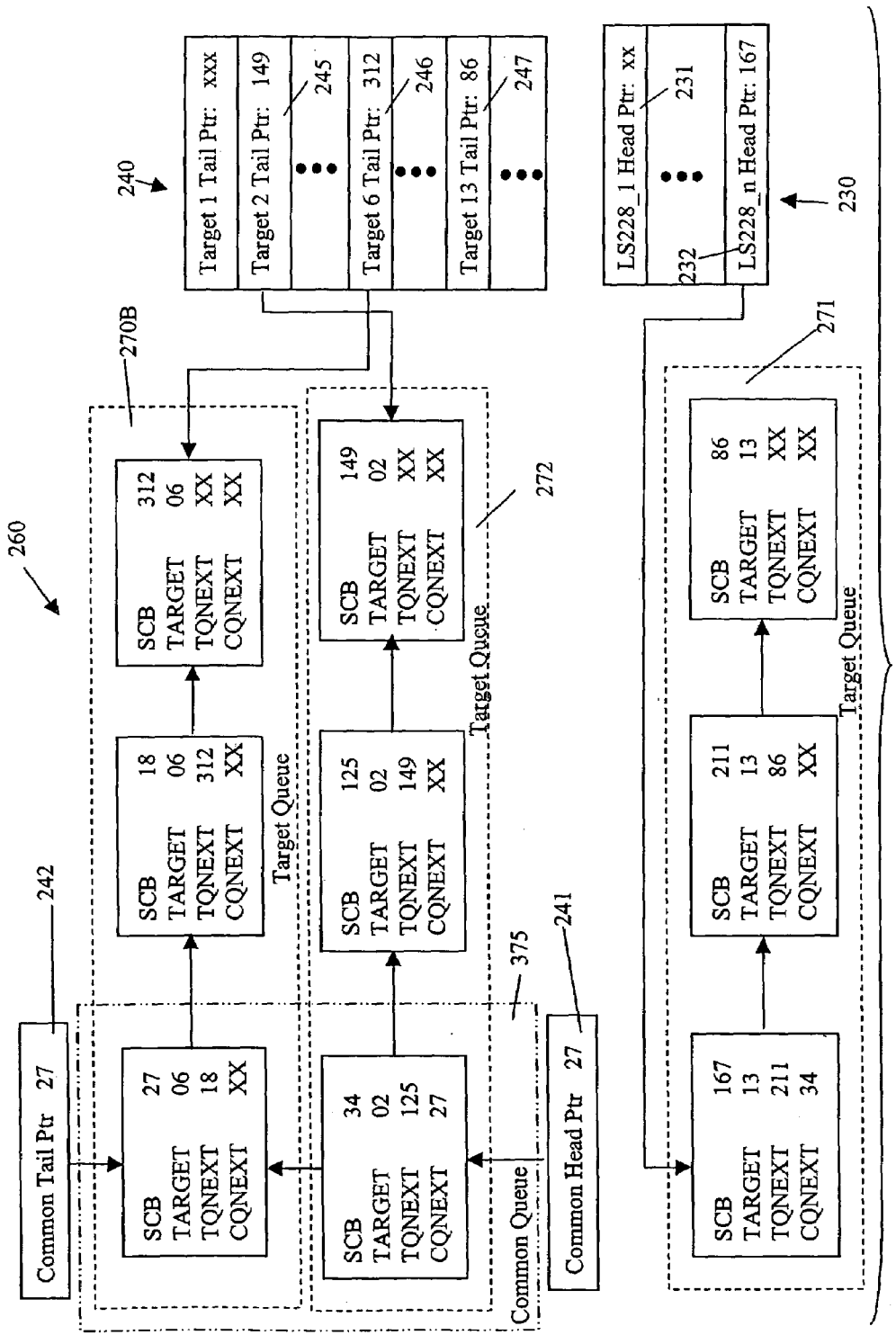

In update common queue tail pointer operation 1005, common queue tail pointer 242 is changed to address SCB 27 (FIG. 11B). Hence, the SCBs remaining in string 270A are appended to the end of common queue 375 as string 270B, and the SCBs for which commands were successfully transmitted to the target are removed from string 270A. Appending the remaining SCBs to the end of common queue 375 assures that all other devices are given an opportunity to receive commands and/or other information before the first device is selected again for information transfer.

The above discussion assumed that string 270A was not empty and so string empty check operation 1001 transferred to read common queue tail pointer operation 1003. However, if the string was empty, i.e., field TQNEXT in the last SCB executed contained an invalid value, string empty check operation 1001 transfers processing to update string tail pointer operation 1002.

In update string tail pointer operation 1002, the string tail pointer in string tail pointer list 240 is set to an invalid value to indicate that there is no string for that device in two-dimensional command block queue 260. This operation effectively terminates string 270A. Operation 1002 also transfers to the done operation.

Hence, management of two-dimensional command block queue 260 after command delivery for SCBs in a string is quite simple. If all commands and/or information specified in the string are transferred to a device, the device tail pointer is loaded with an invalid value. Conversely, when not all the commands and/or information are transferred to the device, the first remaining unprocessed SCB in the string is appended to the tail of common queue 375. The linking of the remainder of the string and the string tail pointer for that string remain unchanged.

With the two-dimensional command block queue of this invention, queue manipulation is simple. SCBs are appended only to the tails of queues. All command blocks for a device are highly available for maximum speed streaming to that device. In particular, wasteful searching across empty queues is not required. Priority of SCB execution is maintained according to the order of delivery by host system 200, although commands for the same device are grouped together. SCBs for which a device cannot accept commands and/or information are given lowest priority by appending the SCBs to the end of the two-dimensional command block queue. Only tail pointers are required for the second dimension of queuing.

Other alternative embodiments of the two-dimensional command block queue of this invention are possible. The above embodiment is applicable to host adapters operating in the SCSI Initiator Mode. The two-dimensional command block queue allows all the SCBs for a particular SCSI target to be very quickly accessed by automated hardware as that hardware streams command blocks from the SCBS in the queue to the SCSI target. Also, in this embodiment of the two-dimensional command block queue, the site in the queue where a new SCB is to be loaded can be quickly determined.

However, some host adapter applications require concurrent execution of SCSI initiator and target modes, or execution in the target mode. To enhance the performance of a host adapter in the SCSI target mode, the above two-dimensional command block queue can be used. As a target device, host adapter 220 maintains a two-dimensional initiator command block execution queue, sometimes called two-dimensional initiator execution queue, which facilitates data transfer for commands with a single initiator device over an I/O bus, such as a SCSI bus.

A two-dimensional initiator command block execution queue includes a plurality of initiator strings, where each initiator strings includes at least one command block that can contain data or status information. Each of the initiator strings is a queue of command blocks that can contain data or status information, e.g., SCSI command blocks (SCBs) containing data or status information, for a specific initiator device on the I/O bus. The operation of this two dimensional queue is similar to that described above except information is transferred to the initiator rather than a target. Accordingly, the above description is incorporated herein by reference.

In still another embodiment, when a target responds to a command, the target's buffer availability limits the target to accepting 1 Kbytes of data but host adapter 220 is not ready to transmit data. A two-dimensional queue of such SCBs are maintained to transfer data to the target. The operation and management of the two-dimensional queue is equivalent to that described above, where data is transferred to a target device instead of the commands as described above. Hence, various combinations of the two-dimensional execution queues and supporting pointers can be used in a host adapter that functions in both the initiator and target modes.

Although particular embodiments of the present invention have been shown and described, it will be apparent to those skilled in the art that changes and modifications may be made without departing from the present invention in its broader aspects. Therefore, the embodiments described herein are illustrative only and are not intended to limit the invention to the specific embodiments described.

I claim:

1. A memory structure comprising:
   a two-dimensional queue comprising:
      a plurality of command blocks in a first linked list; and
      another plurality of command blocks in a second linked list, where only one of said another plurality of command blocks is included in said plurality of command blocks in said first linked list;
   a tail pointer to a tail command block in said second linked list wherein said tail pointer is an only delimiter for said second linked list;
   a tail pointer list including said tail pointer to said tail command block in said second linked listed; and
   a string head pointer list wherein following dequeuing said another plurality of command blocks in said second linked list from said two-dimensional queue, a pointer to said only one of said another plurality of command blocks is included in said string head pointer list.

2. The memory structure of claim 1 further comprising:
   a head pointer to a head command block in said first linked list.

3. The memory structure of claim 2 further comprising:
   a tail pointer to a tail command block in said first linked list.

4. The memory structure of claim 1 wherein said two-dimensional queue is stored in a first memory.

5. The memory structure of claim 4 wherein said first memory comprises a command block array memory.

6. The memory structure of claim 5 wherein said command block array memory is an internal memory of a host adapter.

7. The memory structure of claim 5 wherein said command block array memory is an external memory of a host adapter.

8. The memory structure of claim 4 wherein said string tail pointer list is stored in a second memory different from said first memory.

9. The memory structure of claim 4 wherein said common queue head pointer and said common queue tail pointer are stored in a second memory different from said first memory.

10. The memory structure of claim 4 wherein said string head pointer list is stored in a second memory different from said first memory.

11. The memory structure of claim 10 wherein said second memory comprises a plurality of memories.

12. A structure comprising:
   a two-dimensional queue comprising:
      a common linked list of command blocks having a common head command block and a common tail command block; and
      a string comprising a linked list of command blocks having a string head command block and a string tail command block wherein only said string head command block is included in said common linked list of command blocks;
      a common queue head pointer to said common head command block;
      a common queue tail pointer to said common tail command block;
      a string tail pointer list including a tail pointer to said string tail command block; and
      a string head pointer list wherein following dequeuing said string from said two-dimensional queue, a pointer to said string head command block is included in said string head pointer list.

13. The structure of claim 12 wherein said common linked list contains a maximum of one command block for said string.

14. The structure of claim 13 wherein said string contains only command blocks for a single device.

15. A system comprising:
   a two-dimensional queue comprising:
      a plurality of command blocks in a first linked list; and
      another plurality of command blocks in a second linked list, where only one of said another plurality of command blocks is included in said plurality of command blocks in said first linked list; and
   a memory coupled to said two-dimensional queue, said memory including:
      a tail pointer to a tail command block in said second linked list wherein said tail pointer is an only delimiter for said second linked list;
      a tail pointer list including said tail pointer to said tail command block in said second linked listed; and
      a string head pointer list wherein following dequeuing said another plurality of command blocks in said second linked list from said two-dimensional queue, a pointer to said only one of said another plurality of command blocks is included in said string head pointer list.

16. The system of claim 15 wherein said memory includes:
   a first memory; and
   a second memory; and
      further wherein said tail pointer and said tail pointer list are included in said first memory; and
      said string head pointer list is included in a second memory.

17. The system of claim 16 wherein said second memory comprises a plurality of memories.

18. The system of claim 15 wherein said memory further includes:
   a head pointer to a head command block in said first linked list.

19. The system of claim 15 wherein said memory further includes:
   a tail pointer to a tail command block in said first linked list.

* * * * *